United States Patent [19]

Townsend et al.

[11] 4,322,871
[45] Apr. 6, 1982

[54] LINK CUTTER

[75] Inventors: Ray T. Townsend, Des Moines; Floyd R. Ladd, West Des Moines, both of Iowa

[73] Assignee: Townsend Engineering Company, Des Moines, Iowa

[21] Appl. No.: 154,480

[22] Filed: May 29, 1980

[51] Int. Cl.³ ............................................. A22C 11/00
[52] U.S. Cl. ........................................ 17/1 F; 17/34; 17/49
[58] Field of Search ................... 17/1 F, 34; 83/435, 83/436, 424

[56] References Cited

U.S. PATENT DOCUMENTS

| | | | |
|---|---|---|---|
| 3,659,316 | 5/1972 | Berendt et al. | 17/1 F |
| 3,840,937 | 10/1974 | Berg et al. | 17/1 F |
| 4,104,763 | 8/1978 | Tetsuro | 17/1 F |

*Primary Examiner*—Willie G. Abercrombie
*Attorney, Agent, or Firm*—Zarley, McKee, Thomte, Voorhees & Sease

[57] ABSTRACT

A link cutter includes a support frame having a cutting zero, a first conveyor on one side of the cutting zone for sequentially conveying a plurality of links interconnected by twisted casing sections, a second conveyor on the opposite side of the cutting zone for receiving links from the first conveyor and stretching the twisted casing sections at the cutting zone. A sensor upstream of the cutting zone includes a source of electromagnetic waves directed across the path of the links and a device for sensing those waves which pass between the links adjacent the twisted casing sections so as to actuate a knife within the cutting zone to sever the sensed twisted casing section upon movement of the same to the cutting zone. The sensor may be a light source and photocell adjustably mounted relative to the cutting zone.

8 Claims, 16 Drawing Figures

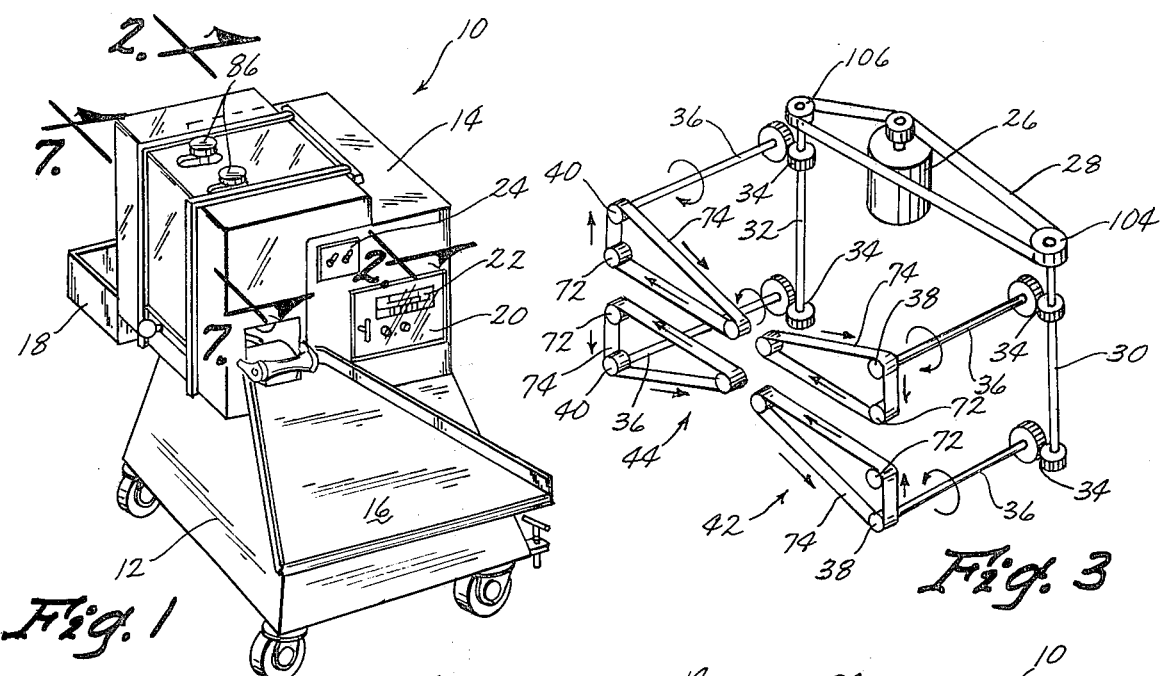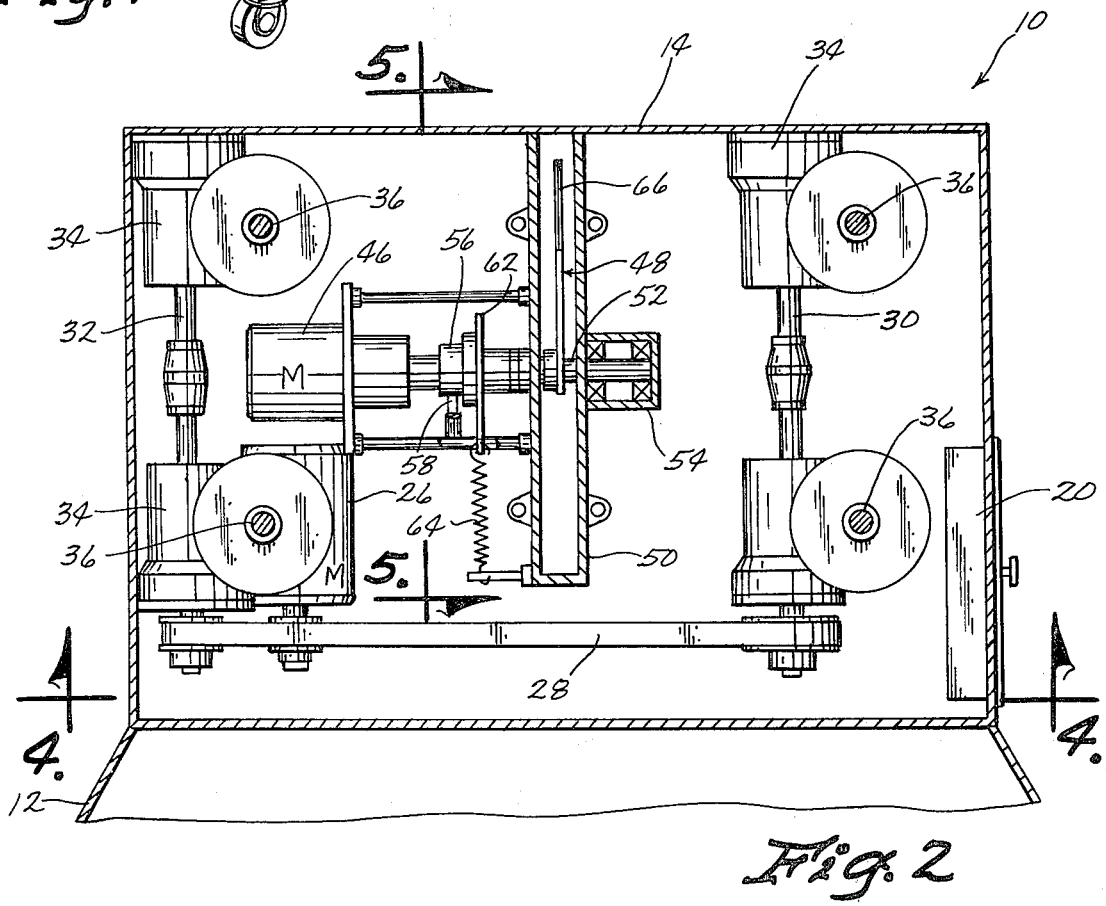

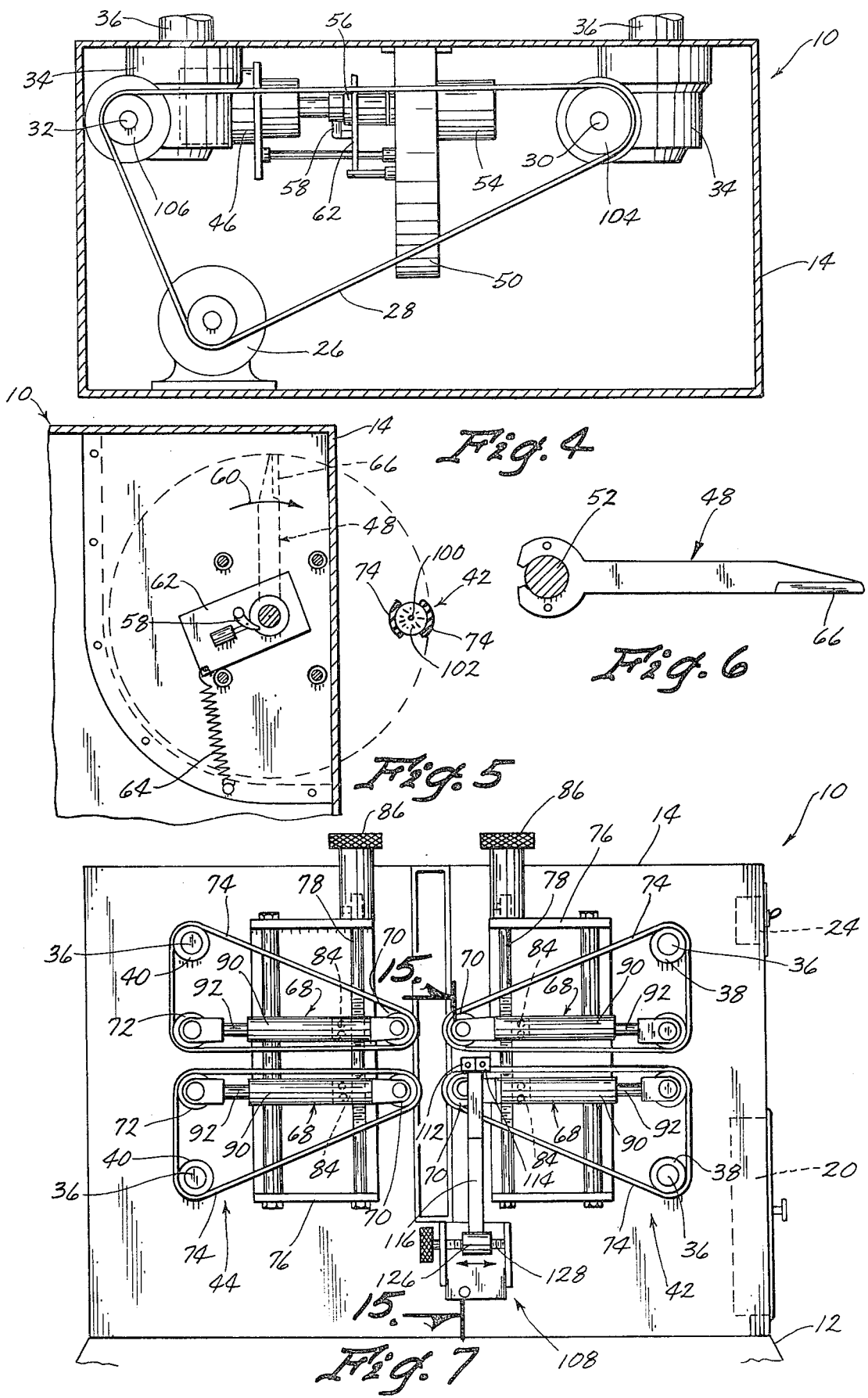

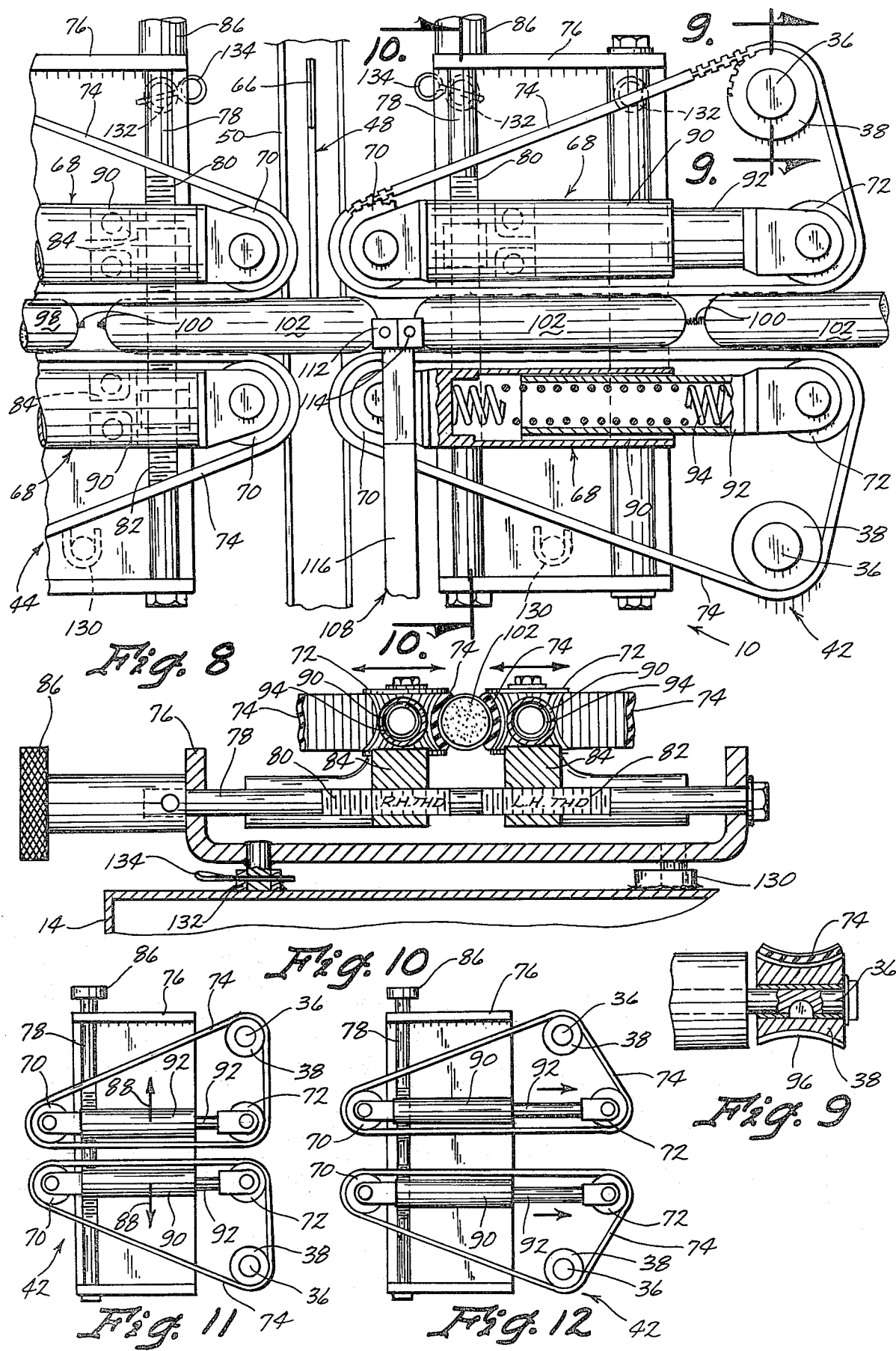

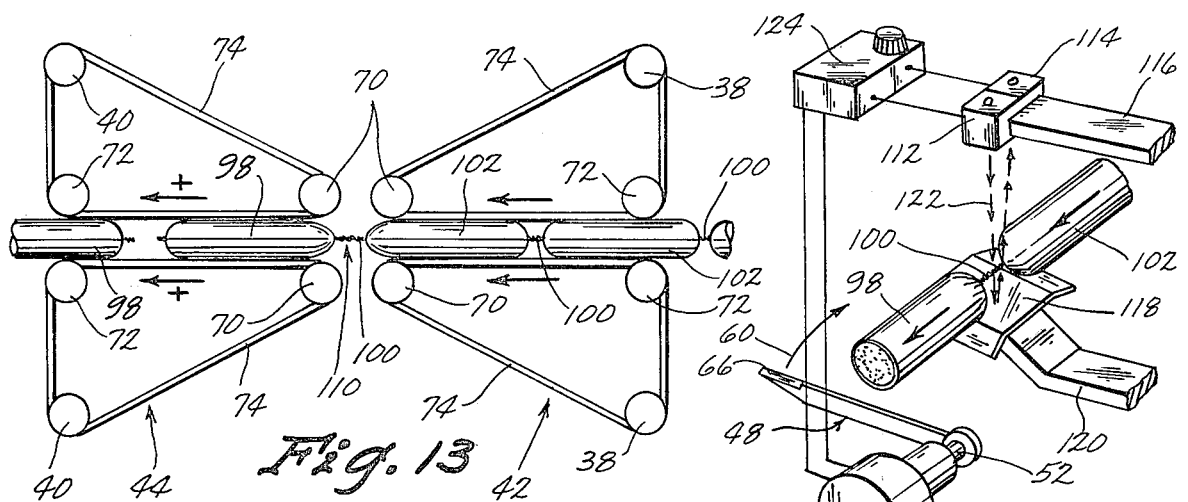
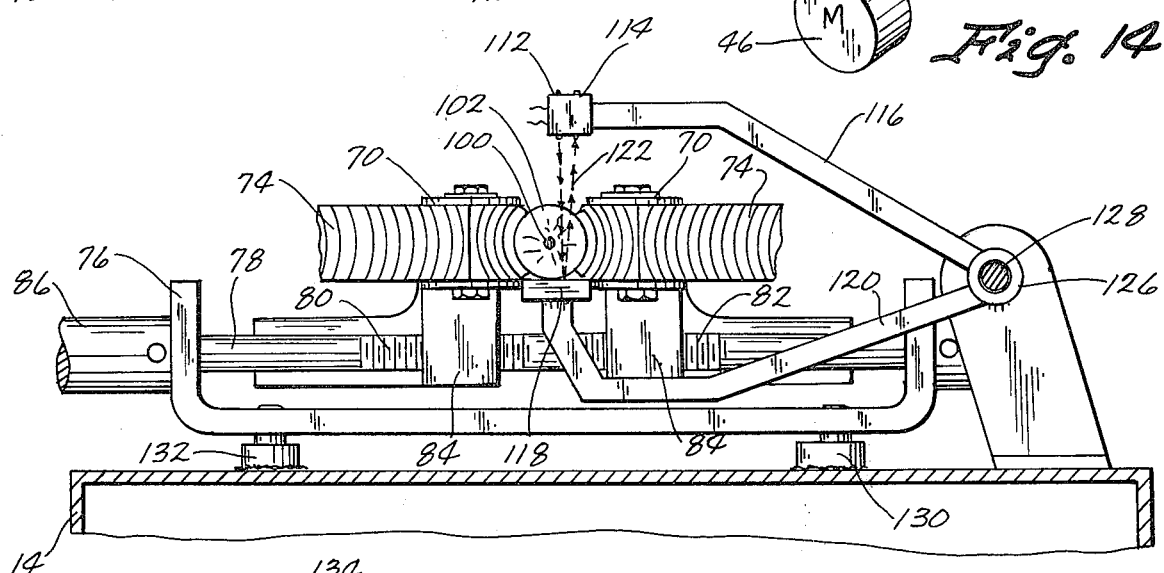
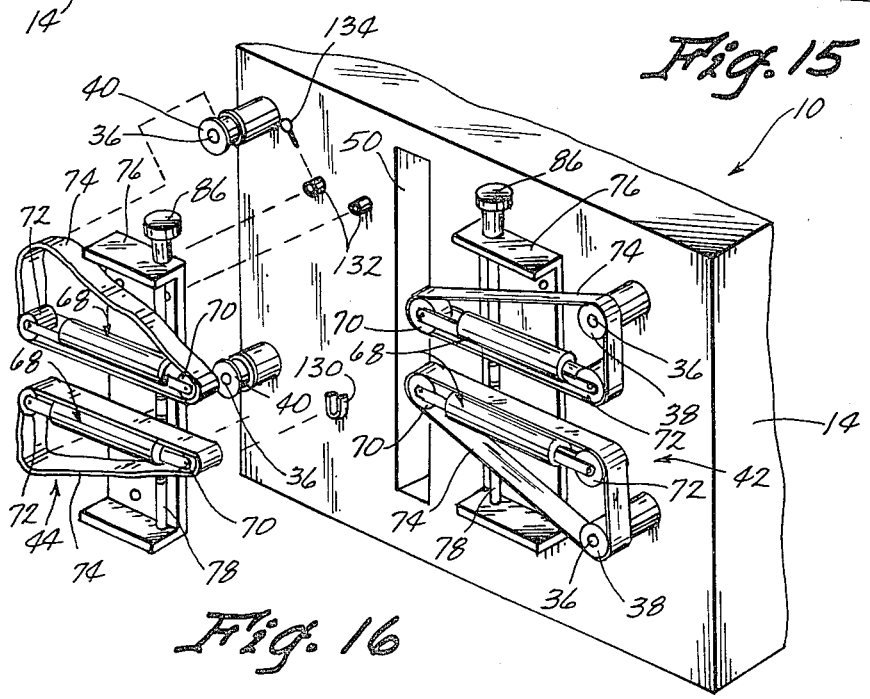

LINK CUTTER

BACKGROUND OF THE INVENTION

The present invention relates generally to an apparatus for separating a plurality of interconnected links and more particularly to a cutter apparatus adapted to separate interconnected sausage links into lengths of one or more sausages.

The output of most sausage making machines is a substantially continuous chain of sausage links interconnected by twisted casing sections. For shipping and/or packaging purposes, it is desirable that such chains of sausages be divided into cut lengths of a given number of sausages. Furthermore, it is desirable to be able to varying the number of sausages per cut length. Accordingly, there is a need for a machine for severing continuous chains of sausage links into lengths of one or more links.

Prior link cutters have generally suffered from one or more of the following shortcomings. Since the commercial value of any given sausage link is substantially destroyed if the link itself is severed in two, it is important that the twisted casing sections between links be accurately sensed and that the timing between the sensing device and cutting knife be accurately set so that only the twisted casing sections between links are severed. Some prior link cutters have employed mechanical feeler arms for sensing the junction between links. Such mechanical sensors can be accidentally tripped by irregularities in the shapes of the sausage links with resultant severing of links.

Another problem associated with link cutter devices is that of accurately positioning the sausages at the station for sensing the junction between them. If the sausages are not centered with respect to the intended conveying path, irregularities in the sausage shape are more likely to be misconstrued as junctions between links.

Another problem associated with prior link cutters is that of accurately timing the feed conveyor with the product removal conveyor. These and other problems of the prior art are believed to be resolved by the link cutter of the present invention.

Accordingly, a primary object of the invention is to provide an improved link cutter.

Another object is to provide an improved link cutter including a generally stationary sensor employing electromagnetic wave propagation and reception for detecting the junction between links.

A related object is to provide an improved link cutter including a light source and photocell sensor.

Another object is to provide a link cutter wherein the sensor is adjustably positioned relative to the cutting knife for varying the lead time for the knife response.

Another object is to provide an improved link cutter wherein the link conveyors accurately position the sausage links relative to the cutting knife.

Another object is to provide an improved link cutter including conveyors which are easily removable as integral units for cleaning purposes and the like.

Another object is to provide an improved link cutter wherein the feed conveyor and product removal conveyor are accurately timed relative to one another independently of the speed of operation.

These and other objects will be apparent to those skilled in the art.

SUMMARY OF THE INVENTION

The link cutter of the present invention is adapted to operate continuously to sever a selected number of links from a generally continuous chain without any accidental destruction of individual links. To do so, the links are accurately positioned and advanced by the conveyors which include parallel runs of cupped belts to define a partially tubular conveying sleeve between them. The feed conveyor and product removal conveyor are operated by a single drive motor connected to the drive rollers of each conveyor for fixing the proportionate speed of said conveyors relative to one another independently of the actual conveying speed of one or the other. The photocell accurately senses the twisted casing sections between adjacent links without the shortcomings associated with mechanical feeler type sensors. Furthermore, the sensor is adjustably mounted relative to the knife to vary the lead time for knife response. Finally, both the feed conveyor and product removal conveyor are removably secured to the apparatus as integral assemblies to facilitate removal for purposes of cleaning and the like.

BRIEF DESCRIPTION OF THE DRAWINGS

FIG. 1 is a perspective view of the link cutter of the invention;

FIG. 2 is an enlarged side sectional view of the conveyor drive means as seen on line 2—2 in FIG. 1;

FIG. 3 is a diagrammatic perspective view of the conveyor drive system;

FIG. 4 is a bottom view of the conveyor drive means as seen on line 4—4 in FIG. 2;

FIG. 5 is a side sectional view of the knife taken along line 5—5 in FIG. 2;

FIG. 6 is an enlarged side view of the knife;

FIG. 7 is an enlarged side view of the link cutter as seen on line 7—7 in FIG. 1;

FIG. 8 is a further enlarged detail side view of the feed conveyor of the apparatus;

FIG. 9 is a sectional view of a feed conveyor drive roller taken along line 9—9 in FIG. 8;

FIG. 10 is an end sectional view of the feed conveyor taken along line 10—10 in FIG. 8;

FIG. 11 is a diagrammatic side view of the feed conveyor adjusted for small diameter links;

FIG. 12 is a diagrammatic side view of the feed conveyor adjusted for larger diameter links;

FIG. 13 is a side diagrammatic view illustrating the varying speeds of the feed and product removal conveyors;

FIG. 14 is an exploded perspective view of the sensor and cutting knife of the apparatus;

FIG. 15 is an enlarged end sectional view of the sensor taken along line 15—15 in FIG. 7; and FIG. 16 is a partially exploded perspective view illustrating the removal of a conveyor unit from the apparatus.

DESCRIPTION OF THE PREFERRED EMBODIMENT

The link cutter 10 of the present invention is shown in FIG. 1 supported on a wheeled cart 12. The link cutter includes a housing 14 having a product in-feed funnel 16 at one side thereof and a severed link receiving container 18 on the opposite side thereof. A control panel 20 displays a dial 22 for selecting the number of links per severed length and on-off switches 24 are provided for the conveyor and cutter motors.

Referring to FIGS. 2 and 3, the housing 14 serves as a support frame for the conveyor drive apparatus. A single conveyor drive motor 26 is connected by a continuous belt 28 to first and seocnd output shafts 30 and 32 which act through respective gear boxes 34 and output shafts 36 to drive the drive rollers 38 and 40 of the first and second conveyors 42 and 44 respectively.

A second motor 46 is shown in FIGS. 2 and 4 for operating the knife 48 which is rotatably supported within a knife guard housing 50. Knife 48 is supported on a knife shaft 52 for rotation within a bearing housing 54. The cutter motor 46 is connected to knife shaft 52 through a single revolution clutch 56. Clutch 56 is shown in FIG. 5 as including a device for preventing shock to the knife from suddenly stopping at the end of each revolution. A solenoid operated ratchet 58 is temporarily disengaged upon each actuation of clutch 56 whereupon knife 48 is rotated in the direction of arrow 60. At the end of each revolution, the ratchet 58 re-engages but a plate 62 which is connected to knife 48 for pivotal movement therewith, permits limited pivotal movement beyond the stopping position against the urging of tension spring 64 which operates to return the knife 48 and plate 62 to the starting position indicating in FIG. 5. Knife 48 includes a sharpened end portion 66 which is adapted to sever the twisted casing section 68 interconnecting adjacent links supported by the first conveyor 42 at the cutting zone of knife 48.

Referring to FIGS. 7-13, the first and second conveyors 42 and 44 are disclosed in greater detail. Both the feed conveyor 42 and product removal conveyor 44 each include a pair of continuous belt conveyors adapted to engage opposite sides of the links being conveyed. Since the product removal conveyor 46 is substantially the mirror image of the feed conveyor 44, only conveyor 44 will be described in detail with like numerals referring to like parts of each.

Each continuous belt conveyor includes one of the drive rollers 38, and an elongated idle roller support arm 68 having idle rollers 70 and 72 rotatably supported at opposite ends thereof. A continuous belt 74 is trained about each drive roller 38 and its associated idle rollers 70 and 72.

The idle roller support arms 68 are mounted on the support frame for adjustment transversely of the path of links between them. For this purpose, a rack 76 includes a transverse shaft 78 rotatably supported thereon and having adjacent right and left hand threaded portions 80 and 82 on which base portions 84 of the idle roller support arms 68 are threadably received. Accordingly, upon rotation of the transverse shaft 78 by a handle 86 on the upper end thereof, the idle roller support arms 68 may be moved close together to accommodate links of small diameter or shaft 78 may be rotated in an opposite direction to further separate the idle roller support arms as indicated by arrows 88 in FIG. 11 for accommodating links of increased diameter as indicated in FIG. 12.

Note that the length of the idle roller support arms 68 automatically adjust to take up the slack in the belts 74 in response to transverse adjustment of the support arms 68. For this purpose, each idle roller support arm 68 includes first and second portions 90 and 92 telescopically slidably interconnected with a compression spring 94 compressed within them to urge the first and second portions apart. Thus tension in the belts 74 is maintained regardless of the spacing between the associated pair of idle roller support arms 68. The threaded connections between the support arms 68 and transverse shaft 78 also serve to maintain the parallel disposition of the support arms 68 so that those portions of the belts 74 between the respective idle rollers 70 and 72 define a parallel run which engages and supports both the top and bottom surfaces of the link.

FIG. 9 is a cross section of drive roller 38 but is also exemplitive of the cupped shape of the idle rollers 70 and 72 as well. Because the peripheral surface of drive roller 38 is both cupped and notched as indicated at 96, the notched belt 74 is also cupped so that the parallel run between idle rollers 70 and 72 defines a partially tubular sleeve between them as shown best in FIG. 10. The arcuate shape of the belts 74 thus provides a support for transversely centering the links between the belts 74 and thereby accurately positioning them for the link sensor described hereinbelow.

FIG. 13 illustrates that the second conveyor 44 operates at a faster rate of travel than the first conveyor 42 with the result that as a link 98 becomes engaged by the second conveyor 44 the twisted casing section 100 between that link 98 and trailing link 102 becomes stretched in the cutting zone between said conveyors to facilitate severing of the twisted casing section 100 by knife 48. The difference in operating speeds of the first and second conveyors 42 and 44 is achieved by providing a larger diameter drive pulley 104 on the first conveyor drive shaft 30 as compared to the smaller diameter drive pulley 106 on the drive shaft 32 for the second conveyor. The relative sizes of these drive pulleys are illustrated in FIGS. 3 and 4.

In FIG. 7, it is seen that a link sensor 108 is positioned on the upstream side of the cutting zone 110 between first and second conveyors 42 and 44 for detecting the presence of a twisted casing section 100 between adjacent links. Referring to FIG. 14, it is seen that the sensor 108 includes a light source 112 and photocell 114 supported on an arm 116 on one side of the path of links through the first conveyor 42 and a reflective surface 118 of chrome or the like carried on an arm 120 on the opposite side of the path of links. The light source 112 directs a beam of light indicated by arrows 122 in FIG. 14 into the path of links through first conveyor 42 at a position displaced from the center thereof so as to be reflected back to the photocell 114 whenever a twisted casing section 100 is positioned between the light source 112 and reflective surface 118. The beam of light 122 is of course interrupted whenever a link is moved into position between the light source and reflective surface.

In FIG. 14 it is seen that the photocell 114 is electrically connected to a switch 124 which, in turn, is electrically connected to the single revolution clutch 56 to actuate the knife when a twisted casing section is sensed by the photocell 114.

The support arms 116 and 120 for the photocell and reflective surface respectively are connected at their opposite ends to a base member 126 threadably received on a shaft 128 carried on housing 14 at a position spaced from and generally parallel to the path of links through the first conveyor 42. Accordingly, rotation of shaft 128 by handle 130 shown in FIG. 7 is operative to adjust the position of the light souce 112, photocell 114 and reflective surface 118 longitudinally of the path of links thereby to adjust the lead time for knife response.

A further feature of the invention is disclosed in FIG. 16 wherein it is seen that each rack 76 for the first and second conveyors is removable as a unit from the housing 14 to facilitate cleaning and the like. The lower portion of each rack includes a fastener adapted to be slide fit within a generally U-shaped bracket 130 and a pair of posts on an upper portion of the rack are axially receivable within a pair of collars 132 on the housing sidewall. The pins are removably fastened within the collars by appropriate spring pins 134.

In operation, an operator trips switches 24 to actuate both the conveyor drive motor 26 and knife drive motor 46. Dial 22 is then adjusted to select the desired number of links per each product length cut by the link cutter apparatus 10. A continuous chain of links is then fed from the product in-feed funnel 16 to the first conveyor 42 which accurately positions the links and advances them toward th cutting zone 110. As each twisted casing section moves past the link sensor 108, the beam of light 122 from light souce 112 is reflected by surface 118 to the photocell 114 which thus provides an electrical signal to the switch 124 associated with the counter of dial 22. After the selected number of casing sections have been counted, the switch 124 electrically actuates the single revolution clutch 56 to rotate the knife 48 through the cutting zone thereby severing the sensed twisted casing section 100. The link sensor 108 is adjustable longitudinally of the path of links so as to fine tune the response time for the knife for the purpose of accurately severing the twisted casing sections in half. Likewise, the handles 86 on the top of the housing 14 may be rotated to adjust the spacing between the idle roller support arms of the first and second conveyors to accommodate links of a given diameter. When the link cutter has completed its operation, it is an easy matter to pull the spring pins 134 on the conveyor racks 76 and to remove the belts 74 from the drive rollers 38 and 40 so that the racks 76 may be removed from the housing 14 for cleaning purposes.

Whereas a preferred embodiment of the invention has been shown and described herein, it will be apparent that many modifications, substitutions and alterations can be made without departing from the intended broad scope of the invention as defined in the appended claims. For example, whereas visible light is preferred for detecting the presence of the twisted casing sections 100, it is apparent that sensors using other forms of electromagnetic waves may be substituted in other embodiments for the light source and photocell disclosed herein.

Thus there has been shown and described a link cutter which satisfies at least all of the stated objects.

We claim:

1. An apparatus for separating a plurality of links interconnected by twisted casing sections, comprising
    a support frame including a cutting zone having opposite upstream and downstream sides,
    a first conveyor on the upstream side of said cutting zone for sequentially conveying joined links to said cutting zone,
    a second conveyor on the opposite downstream side of said cutting zone for receiving links from said first conveyor, said second conveyor being operable at a faster rate of travel than said first conveyor for stretching the twisted casing section between links at said cutting zone,
    a knife movably supported in said cutting zone for severing the stretched twisted casing section,
    a knife drive means, and
    a sensor positioned on the upstream side of said cutting zone for detecting the presence of a twisted casing section between a pair of links, said sensor including a source of electromagnetic waves directed across the path of said links and means for sensing those waves which pass between links adjacent the twisted casing section,
    said sensing means being operatively connected to said knife drive means for cutting movement of the knife through the sensed twisted casing section upon movement of said twisted casing section downstream from said sensor to said cutting zone,
    said first and second conveyors each comprising a pair of continuous belt conveyors adapted to engage opposite sides of said links, and
    each pair of continuous belt conveyors including a plurality of cupped rollers and a pair of continuous belts trained about said cupped rollers to define a partially tubular conveying sleeve between said belts.

2. The apparatus of claim 1 wherein said sensor is adjustably supported on said support frame, upstream of the downstream edge of said first conveyor, for movement toward and away from said cutting zone, thereby to vary the lead time for actuating said knife drive means.

3. The apparatus of claim 1 wherein said sensor includes a light source operative to direct a beam of light into the path of said links and a photocell positioned for sensing said beam of light when said links are advanced to a position such that a twisted casing section is positioned adjacent said beam of light said light source and photocell being positioned in adjacent relation on one side of the path of said links, and a reflective surface is positioned on the opposite side of said path for reflecting said beam of light from said light source back toward said photocell when a twisted casing section enters the space between said light source and reflective surface.

4. The apparatus of claim 3 wherein said sensor further comprises a threaded shaft carried on said support frame at a position spaced from and generally parallel to the path of links on said first conveyor, a base member threadably carried on said threaded shaft, a pair of arms extended outwardly from said base member to opposite sides of said path of links, said light source and photocell being carried on one arm and said reflective surface being carried on the opposite arm, and said threaded shaft being rotatable to adjust the position of sid light source, photocell and reflective surface longitudinally of the path of said links.

5. The apparatus of claim 1 wherein said knife drive means comprises a knife shaft on which said knife is rotatably supported, means for continuously rotating said knife shaft, a single revolution clutch interconnecting said knife and knife shaft whereby upon actuation of said knife drive means, said knife is coupled to said shaft by said clutch for rotation through a single revolution and further comprising a shock prevention device for said knife comprising a plate rotatably supported on said knife shaft, spring means connected to and extended between said plate and support frame for urging said plate to a stop position, and means for coupling said knife to said plate for limited overtravel in unison against the urging of said spring means at the end of each rotation of said knife.

6. The apparatus of claim 1 wherein
    each continuous belt conveyor comprises a drive roller rotatably supported on said support frame, an elongated idle roller support arm including an idle roller rotatably supported at each end thereof, a continuous belt trained about said drive roller and idle rollers and means for supporting said idle roller support arm on said support frame so that the continuous belts associated with said pair of continuous belt conveyors define a parallel run for conveying links therebetween, said idle roller support arms being adjustably supported on said support frame for movement toward and away from one another for varying the spacing between said parallel runs to accommodate links of various diameters, and said idle roller support arm including first and second portions each connected to a respective one of said idle rollers and means urging said first and second portions apart to extend the length of said support arm, thereby to take up slack in said continuous belt in response to adjustment of the spacing between said idle roller support arms.

7. The apparatus of claim 6 wherein said idle roller support arms are supported on a rack, said rack being removably secured to said support frame whereby upon disengagement of said continuous belts from said drive rollers, the remainder of each conveyor may be removed as a unit from said apparatus.

8. The apparatus of claim 7 wherein said rack includes a first shaft rotatably supported thereon, said shaft having adjacent right and left hand threaded portions, said pair of idle roller support arms being threadably received on said right and left hand threaded portions whereby upon rotation of said threaded shaft in opposite directions, said idle roller support arms are moved closer together and further apart respectively.

* * * * *